United States Patent
Helsen et al.

(10) Patent No.: US 10,218,690 B2
(45) Date of Patent: Feb. 26, 2019

(54) ABSTRACTING AN AUTHENTICATION SEQUENCE USING HTTP

(71) Applicant: International Business Machines Corporation, Armonk, NY (US)

(72) Inventors: Simon Helsen, Komoka (CA); Jose A. Rodriguez, Cayey, PR (US); Ritchard L. Schacher, Cary, NC (US); Patrick R. Wardrop, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 15/294,880

(22) Filed: Oct. 17, 2016

(65) Prior Publication Data
US 2018/0109506 A1    Apr. 19, 2018

(51) Int. Cl.
    *G06F 7/04*    (2006.01)
    *H04L 29/06*    (2006.01)
    *H04L 29/08*    (2006.01)
(52) U.S. Cl.
    CPC .......... *H04L 63/08* (2013.01); *H04L 63/0892* (2013.01); *H04L 63/20* (2013.01); *H04L 67/02* (2013.01); *H04L 67/42* (2013.01)
(58) Field of Classification Search
    CPC ..... H04L 63/08; H04L 63/082; H04L 63/083; H04L 63/0884; H04L 63/10; H04L 9/32; H04L 9/3271; G06F 21/31
    USPC .......................................................... 726/6
    See application file for complete search history.

(56) References Cited

U.S. PATENT DOCUMENTS

| | | | |
|---|---|---|---|
| 8,438,212 B2 | 5/2013 | Preston et al. | |
| 8,484,708 B2 | 7/2013 | Chern | |
| 8,954,596 B2 | 2/2015 | Ronca et al. | |
| 9,137,228 B1 | 9/2015 | Newstadt | |
| 9,584,520 B2 * | 2/2017 | Logue | H04L 63/0884 |
| 2008/0077791 A1 | 3/2008 | Lund et al. | |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Samson B Lemma
(74) *Attorney, Agent, or Firm* — Law Office of Jim Boice

(57) ABSTRACT

An enterprise server is provisioned with an authentication response language, where the authentication response language allows the enterprise server to issue instructions for authentication steps to an enterprise client, which enables the enterprise client to execute a set of instructions for navigating an authentication sequence. The set of instructions installed into and served by the enterprise server varies depending on a protocol inherently used by the authentication topology. The enterprise client, when accessing a protected resource, and not already authenticated, receives a set of authentication instructions from the enterprise server formulated in the authentication response language. The client starts to interpret the provided authentication instructions, but controls the presentation layer and interface of any user interactions. The client follows the sequence by sending requests and receiving responses from one or more servers in the topology until the sequence is complete.

20 Claims, 5 Drawing Sheets

(56) References Cited

U.S. PATENT DOCUMENTS

| | | | |
|---|---|---|---|
| 2011/0145900 A1* | 6/2011 | Chern | H04L 9/3271 726/7 |
| 2011/0246616 A1* | 10/2011 | Ronca | H04N 21/26258 709/219 |
| 2012/0191771 A1* | 7/2012 | Preston | G06Q 30/04 709/201 |
| 2016/0034892 A1 | 2/2016 | Carpenter et al. | |
| 2016/0119354 A1 | 4/2016 | Logue et al. | |

OTHER PUBLICATIONS

Loreto et al., "Known Issues and Best Practices for the Use of Long Polling and Streaming in Bidirectional HTTP". ip.com, Apr. 1, 2011, IPCOM000205867D.

* cited by examiner

ABSTRACTING AN AUTHENTICATION SEQUENCE USING HTTP

BACKGROUND

The present disclosure relates to the field of computers, and particularly to computers that communicate via a network. More particularly, the present disclosure relates to authentication of computers that communicate via a network.

SUMMARY

In one or more embodiments of the present invention, a method, system, and/or computer program product abstracts an authentication sequence between a client, a server, and zero or more authentication servers. An enterprise server is provisioned with an authentication response language, where the authentication response language allows the enterprise server to issue instructions for authentication steps to an enterprise client. The authentication response language enables the enterprise client to execute a set of instructions for navigating an authentication sequence. The set of instructions installed into and served by the enterprise server, for navigating the authentication sequence, varies depending on a protocol inherently used by the authentication topology. The enterprise client, when accessing a protected resource, and not already authenticated, receives a set of authentication instructions from the enterprise server formulated in the authentication response language. The client starts to interpret the provided authentication instructions, but controls the presentation layer and interface of any user interactions, if any. The client follows the sequence by sending requests and receiving responses from one or more servers in the topology until the sequence is complete.

In one or more embodiments of the present invention, the authentication resolution of the enterprise client is one of success or fail based on user interactions at the enterprise client.

In one or more embodiments of the present invention, the protocol inherently used by the enterprise client is either HTTP or a non-HTTP native protocol.

DETAILED DESCRIPTION

Figure 1:
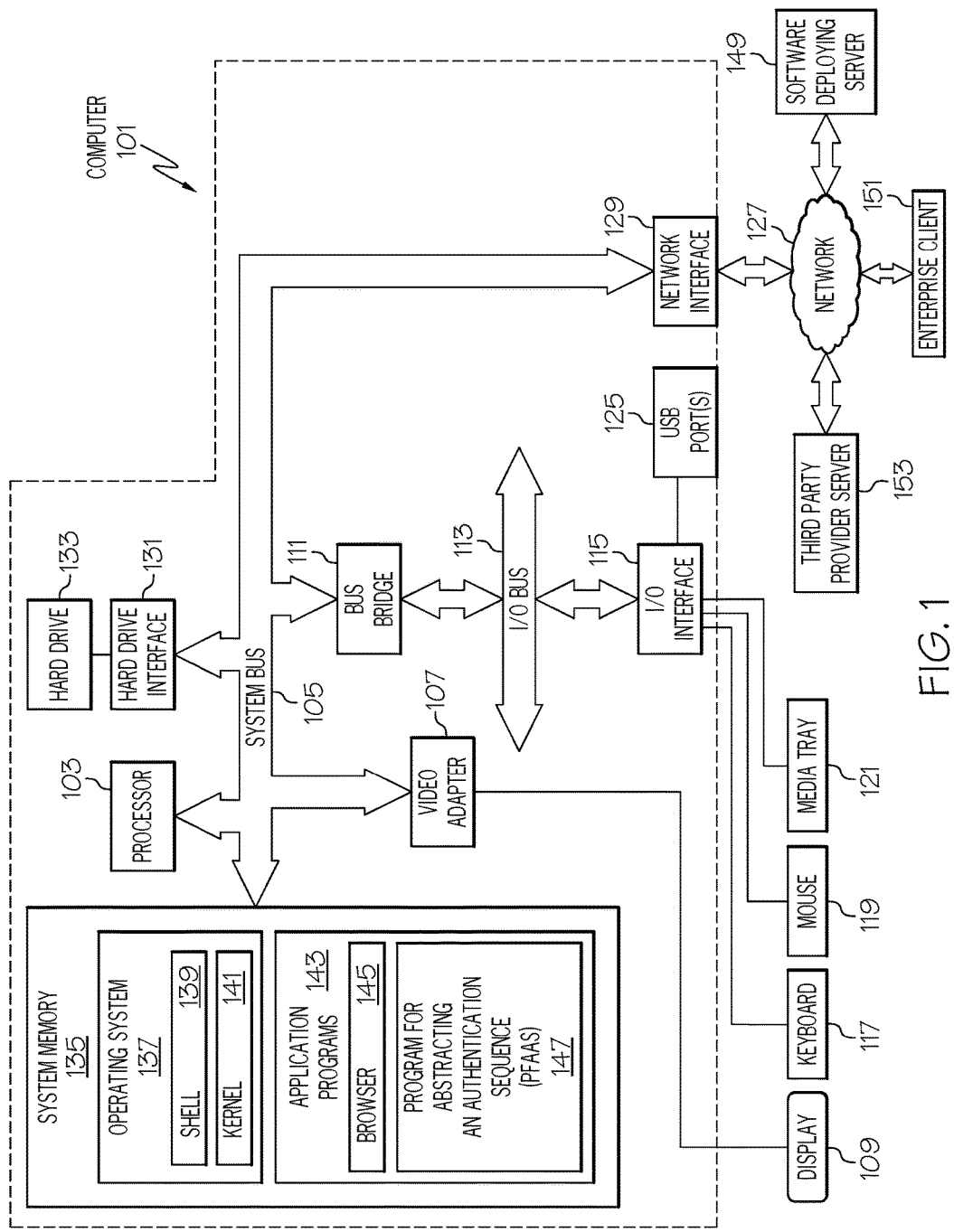
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or electronic client 151 and/or third party provider server 153 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program For Abstracting an Authentication Sequence (PFAAS) 147. PFAAS 147 includes code for implementing the processes described below, including those described in FIGS. 2-3. In one embodiment, computer 101 is able to download PFAAS 147 from software deploying server 149, including in an on-demand basis, wherein the code in PFAAS 147 is not downloaded until needed for execution. In one embodiment of the present invention, software deploying server 149 performs all of the functions associated with the present invention (including execution of PFAAS 147), thus freeing computer 101 from having to use its own internal computing resources to execute PFAAS 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

In accordance with one or more embodiments of the present invention, authentication mechanisms in distributed server deployments and cloud systems involve a number of steps to be made by the user agent. Some of these steps involve user interactions, others are redirections to other server nodes involved in the authentication exchange using various authentication protocols. Examples of such authentication protocols include OAuth2 (Version 2.0 of OAuth, an open standard framework for authorization without exposing confidential information such as passwords), OpenID 2.0 (Version 2.0 of Open ID, an open standard and decentralized authentication protocol), Open ID Connect (an authentication layer on top of OAuth 2.0), SAML (Security Assertion Markup Language), etc.

In the prior art, the specification of these steps is an implicit HTTP request/response sequence involving a browser agent. That is, in the prior art, concrete implementations on the different participating server nodes not only dictate the authentication protocol steps, but also impose their own markup and layout, be it with Hypertext Markup Language (HTML), HTML 5, Javascript or some other client-side visualization language.

This mixing of view and controller (in the traditional Model-View-Controller (MVC) sense) limits the applicability of some of the protocols.

First, non-browser agents, such as those not directly interpreting HTML and related user interaction technologies, experience difficulties in dealing with the richness of the markup and interaction languages. In practice, implementations often try to get around this by tweaking the server deployments to return special headers to detect user input requests. For example, the response returned in FORM-based authentication (in which a user is presented with an editable form when logging in, authenticating, etc.) in JEE (Java Enterprise Edition) application containers contain a header indicating that authentication is required. A non-browser agent can then pro-actively POST requests to the JEE/j_security_check service. But that only works if a centrally managed system controls the node returning the form. In many deployments, especially with centrally managed identity providers, it is not possible to control the nature of the user interaction or return custom headers in the HTTP sequence. The advent of mobile computing specifically has increased the number of use cases in which the agent is not actually a browser, yet, typical SAML 2.0 (Version 2.0 of the Security Assertion Markup Language) identity providers assume that HTTP interactions are performed by browsers.

Second, a server requesting user input to complete an authentication sequence imposes its user input technology on the agent. For example, if an identity provider only assumes that an agent is a browser, then non-browser agents will have trouble processing the HTML or Javascript. But even for browser agents, the user experience imposed by an external identity provider may not be always be desirable (e.g., if the identity provider is foreign to the organization). Moreover, applications may want to enrich the authentication exchange with multiple and perhaps optional steps from different security providers.

In order to address these two limitations, the present invention presents a new and useful technology-based solution. More specifically, the present invention presents a JSON-based (JavaScript Object Notation based) authentication response language, which is able to express the required HTTP-based authentication steps without assuming a browser or imposing specific markup or exact user interaction forms. Server applications then return an authentication response sequence, provided their agents are able to interpret the JSON appropriately. There is no restriction as to whether the agent is a native application (e.g., an Eclipse rich client), or a browser (which may be served using HTML5 (Version 5 of the Hypertext Markup Language) and Javascript messages coming from the application). In either case, applications can control the user experience throughout the authentication sequence, even if that sequence leads the agent to communicate with external nodes. Moreover, non-browser agents only have to implement an interpreter for the authentication response language. Any change in the authentication sequence would only require an update in the sequence description on the server application.

Figure 2:
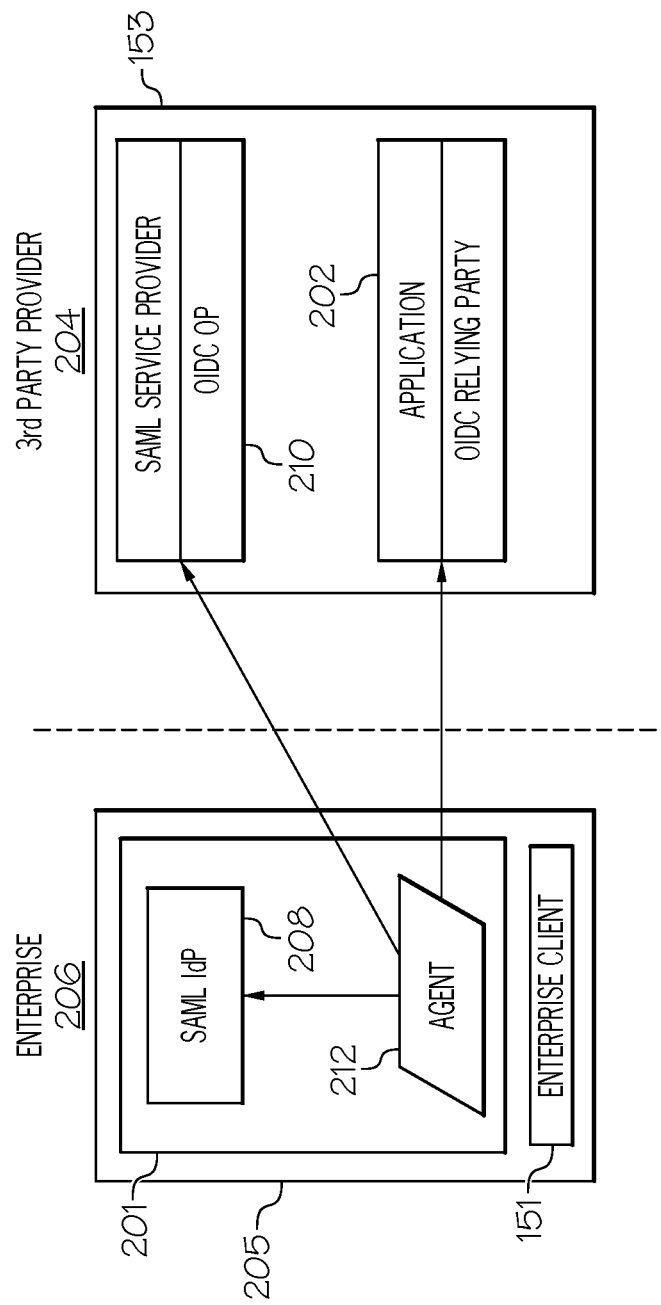
FIG. 2 illustrates an exemplary exchange between an enterprise server and a third party provider to authenticate a client.

Consider now an exemplary embodiment of the present invention as shown in FIG. 2.

In an SAAS (Software as a Service) scenario, an application 202 is hosted by a third party provider 204 (using the third party provider server 153 introduced in FIG. 1 and shown again in FIG. 2), but consumed by a private enterprise 206 (e.g., by the enterprise client 151 introduced in FIG. 1). Moreover, although the application 202 used to authenticate the end-user (i.e., private enterprise 206) is hosted outside the enterprise's intranet 205, the identity provider (i.e., SAML idP—SAML identity provider 208) is kept inside the enterprise's intranet 205, since it deals with sensitive identity data and credentials. Therefore, an agent 212 interfaces between the SAML idP 208 and the third party provider 204.

Thus, the enterprise's private SAML idP 208 is an identity container that manages the identity data of its employees across its software product landscape. This SAML provider implements the HTTP POST Binding, which relies on self-POSTing forms.

The application 202 is implemented in the third party provider 204 as a Relying Party (thus denoted in FIG. 2 as the "OIDC Relying Party") for an OpenID Connect 1.0 provider (OIDC OP), as associated with the depicted SAML service provider 210. In order to satisfy both the security limitations of the deployment and bridge the gap between OpenID Connect and SAML 2.0, an OIDC OP is deployed with the third party provider 204. However, instead of functioning as an immediate identity provider, the OIDC OP acts as the SAML Service Provider 210, as shown in FIG. 2.

Assume now that application 202 has non-browser agents. In order to avoid requiring that the agent 212 has to interpret the specifics of the corporate SAML Identity Provider 208, the OIDC application 202 is equipped with an authentication response sequence description, which details the exact authentication requirements. The OIDC relying party (associated with application 202), instead of instructing the agent 212 to immediately start an OIDC Authorization Code Flow, simply returns an authentication response sequence. The agent interprets this authentication response sequence until an identity for the end-user has been established (based on the SAML ipP 208) and returned to the application 202 without having to understand the HTML from the SAML 2.0 identity provider 210.

In one or more embodiments of the present invention, the SAML idP 208 and agent 212 are maintained within the enterprise server 202 (analogous to computer 101 shown in FIG. 1) as being coupled to the enterprise's intranet 205.

The following portion of the present disclosure presents an informal specification of the authentication response language. In order to support both interactive agents and non-interactive agents (such as scripting commands), the present invention provides a mechanism whereby the same authentication response sequence allows agents to behave like one or the other.

Overall Response

The response type for an authentication response sequence is a JSON (JavaScript Object Notation) list, where each element denotes a unique step, as described by the following exemplary instructions:

```
[ { step : <STEP_UNIQUE_ID>,
    request : <REQUEST>,
    responses: <RESPONSES>,
    challengedata: [ <CHALLENGE _DATA_ELEMENT>,
        ...
        ]
  },
  ...
]
```

The <STEP_UNIQUE_ID> is a unique string identifying the step.

The challengedata is optional. It is only required if the step requires user input. If no user input is required, the step will continue its execution.

An overall response includes all steps a client needs to follow in order to successfully finish authentication.

<CHALLENGE_DATA_ELEMENT>

The request for user input takes the form shown in the following exemplary instructions:

```
{ id : <UNIQUE_ID>,
        kind : 'userid' | 'password' | 'unspecified' | ...,
    interactive : {
    label : <LABEL>,
    value : <VALUE>,
            type: 'string' | 'stringMasked' | 'boolean' |
            'integer' | 'double',
        required : <REQUIRED_BOOLEAN>,
        validator: <VALIDATOR>
}
```

The <UNIQUE_ID> is a unique string identifying the challenge data element.

The attribute kind is a string identifying the nature of the challenge data. Non-interactive clients need this in order to know what data to feed the challenge. Interactive clients can obtain the right information by directly asking the user. The provided kind-list is non-exhaustive.

The kind 'unspecified' implies that a non-interactive client will not be able to provide the challenge data and should exit with no further interaction with the agent.

The "interactive" attribute contains information which is only relevant for interactive clients.

The attribute <LABEL> is provided in the client's locale (extractable from the incoming request). This string may also reference variables from previous responses as explained below.

The <VALUE> is a default static value to show and is optional. This string may also reference variables from previous responses as explained below.

The "type" indicates what JSON type is acceptable, where a stringMasked indicates the string needs to conceal its contents when an end-user types it in.

The attribute "required" indicates whether some non-empty data has to be provided by the end-user. It is optional and will be false by default. It allows interactive clients to force a user to enter data before permitting the next step to be executed.

The "validator" is a POSIX ERE (Portable Operating System Interface for Unix Extended Regular Expression) regular expression that indicates if any provided string input is valid. It is optional and will be ignored for non-string types.

<REQUEST>

The request part of a step triggers the agent 212 to perform an HTTP GET or HTTP POST request, either after required user data has been provided or immediately if no challenge data was requested, as described in the following exemplary instructions:

```
{ method : GET|POST,
    url : <ABSOLUTE_URL>,
    headers : [ { name: <HEADER_NAME>,
        value: <HEADER_VALUE> } ,
        ...
        [ ,
    body: <BODY_VALUE>
}
```

All attributes are required.

A request has to be either a GET or POST method.

The endpoint is specified with an <ABSOLUTE_URL> as a string and can reference variables.

The request can be given any number of headers with a name and value, where the <HEADER_NAME cannot reference any variables.

Finally, a request can specify a body where <BODY_VALUE> is again a string and is allowed to reference variables.

Requests can reference any previously bound variable VAR by inserting it zero or more times in the <ABSOLUTE_URL>, <HEADER_VALUE>, or <BODY_VALUE>, but included in @. Thus, a variable reference has the form @VAR@ and is substituted at runtime when the request is actually executed.

Generally, a <REQUEST> can only reference any previously bound variable. Referencing an unbound variable is invalid. Variables are bound either in a previously returned response as specified in the <RESPONSES> attribute, or in a <CHALLENGE_DATA_ELEMENT>. In the latter case, the <UNIQUE_ID> automatically becomes the variable name, but still needs to be referenced by enclosing it with @.

<RESPONSES>

The responses part of the authentication process steps instructs the agent 212 how to deal with different possible responses from the third party provider 204 shown in FIG. 2. This involves recognizing different responses as well as indicating the next step to take, as described in the following exemplary instructions:

```
[ { pattern: { status: <STATUS_CODE>,
            headers: [ { name : <HEADER_NAME>,
                    value: <HEADER_VALUE_PATTERN> },
                ...
                ],
            body: 'regex' | 'xpath' |
                'jsonpath'#<BODY_VALUE_PATTERN>
    },
    action: <ACTION>,
    interactive_action: <ACTION>
  },
  ...
]
```

There can be any number of response pattern/action pairs. The first matching pair will determine the next action for the client.

A pattern consists of three attributes: status, headers, and body, where each attribute is optional. If an attribute is not present, it is considered a wildcard.

If the pattern attribute itself is not present at all, the associated <ACTION> will automatically be a default action.

The status has to be a valid/invalid HTTP status code, indicating whether or not the OIDC Relying Party is able to handle HTTP instructions.

The headers attribute may contain zero or more header patterns where the <HEADER_NAME> is a string and the <HEADER_VALUE_PATTERN> is a POSIX ERE (Portable Operating System Interface for uniX Extended Regular Expression) regular expression pattern.

The <BODY_VALUE_PATTERN> can be either a POSIX ERE regular expression, an XPath (XML Path) pattern or a JSONPath (Java Script Object Notation Path) pattern. In order to indicate what pattern is used, the type of the pattern needs to be explicitly provided.

The attribute interactive_action is optional and only required if the expected actions for an interactive and non-interactive client are different. If it is not present, it is assumed that action can be used by both types of clients.

<ACTION>

There are three different possible actions.

Complete

{state:'complete'}

This sort of (complete) action means that for the given response, the client is done with its authentication process and the client should process the response as it would normally do when attempting to access a protected URL (Uniform Resource Locator).

```
Error
{ state: 'error',
  errorcode: 'invalidcredentials' | 'unspecified'
  errormessage: <ERROR_ MESSAGE> }
```

This 'error' state instructs the client to abort the authentication sequence because there is some sort of problem for which there is no (authentication) follow-up action. The returned "errorcode" indicates the nature of the problem. If the problem is not one of the pre-determined error codes, it will be "unspecified". The <ERROR_MESSAGE> is optional and explains the problem in the locale of the end-user, determined by the HTTP locale headers.

```
Continue
{ state: 'continue',
  nextstep : <STEP_UNIQUE_ID>,
  headerbindings : [ { name: <HEADER_NAME>,
                variables: ['<HVAR1>',.. .,'HVARN'],
                <HVAR1> : <VALUE_ BINDING_PATTERN_ 1>,
                ...
                <HVARN> : <VALUE_BINDING _PATTERN_N> },
            ...
            ],
  bodybindings : { variables: ['<HVAR1>',....,'HVARN']
        <BVAR1> : 'regex' | 'xpath' |
                'jsonpath' #<BODY_BINDING_1>,
        ...
        <BVARN> : 'regex' | 'xpath' |
                'jsonpath' #<BODY_BINDING_N> }
}
```

A "continue" action indicates what the next step is that needs to be taken. The next step is identified by referencing a <STEP_UNIQUE_ID>.

The referenced <STEP_UNIQUE_ID> needs to exist in the overall response. If not, the action is invalid.

Optionally, the "continue" action may include any number of headerbindings and bodybindings. These declarations bind variables to parts of the respective headers and body. All variables are first declared as strings in the variables attribute to permit a client to retrieve them from the data object.

The <HEADER_NAME> references a response header. If no such header exists, no variables will be bound.

The variable names <HVAR1>, <BVAR1>, etc. are unique across the entire JSON response.

As with pattern matching for the body, the binding indicates what the type is of the pattern expression.

In the case of XPath and JSONPath, the first match binds the variable. Any remaining matches are not regarded.

In the case of the regular expression (e.g., POSIX ERE), a variable is bound to the first and longest (greedy) match.

Exemplary Process Instructions

In the example depicted below, assume that there is a need for an SAML IdP with a POST-binding based on JEE and configured with FORM authentication. Moreover, also assume that sometimes the SAML IdP may require the end-user to answer a security question. It may not be known when that does happen or will happen, so the example below takes this scenario into consideration. The example show below sometimes omits detailed patterns and strings and uses the ellipsis ( . . . ).

```
[
  { step : 'saml_idp_post',
    // the initial saml idp post an agent needs to make to start the SAML authentication
    // flow
    request : {
      method : 'POST',
      url : 'https://idp.example.org/SAML2/SSO/POST',
      headers : [
```

-continued

```
            { name : 'Content-Type', value : 'application/x-www-form-urlencoded' }
          ],
          body : 'SAMLRequest=...&RelayState=...&submit=Submit'
          // the SAMLRequest and RelayState are known to the SP (OIDC OP) and should be
          // provided
        },
        responses : [
          { pattern : {
              status : 200,
              body : "regex#.*SAMLResponse.*"
              // we use a simple regular expression to determine that the 200 is the self-posting
              // response if there is no challenge
            },
            action : {
              state : 'continue',
              nextStep : 'saml_sp_post',
              bodybindings : {
                variables : ['sp_post_action_url', 'sp_post_saml_request' ,'sp_post_relay_state'],
                sp_post_action_url : 'xpath#...',
                sp_post_saml_request : 'xpath#...',
                sp_post_relay_state : 'xpath#...'
              }
            }
          }
        },
        { pattern : { status : 200 },
          // this is a catch-all for a 200 response. The assumption is that the IdP is configured
          // for FORM without revealing details about nature of the form. Possibly, in a real
          // scenario, we could have more pattern details to make sure we see the user creds FORM
          action : {
            state : 'continue',
            nextStep : 'post_user_creds'
          }
        }
        // an agent should probably be prepared to react to different 401s and then fall back
        // into the pattern. I am thinking that, in general, the protocol should not deal with 401s,
        // but assume that the agent takes care of it under the hood, very much like a browser
      ]
  }
  ,
  { step : 'post_user_creds',
    challengedata : [
      { id : 'post_user_creds_userid',
        kind : 'userid',
        interactive : {
          label : 'Provide user id',
          type : 'string',
          required : true,
        }
      },
      { id : 'post_user_creds_pwd',
        kind : 'password',
        interactive : {
          label : 'Provide user password',
          type : 'stringMasked',
          required : true
        }
      }
    ],
    request : {
      method : 'POST',
      url : 'https://idp.example.org/j_security_check',
      // we assume FORM auth on the IdP
      headers : [
        { name : 'Content-Type', value : 'application/x-www-form-urlencoded' }
      ],
      body : 'username=@userid@&password=@password@'
    },
    responses : [
      { pattern : {
          status : 302,
          headers : [ { name : 'Location', value : '.*/form/login/fail.*'}]
        }, // this indicates that the user credentials were invalid
        action : {
          // for non-interactive clients ,we need to fail
          state : 'error',
          errorcode : 'invalidcredentials',
          errormessage : 'The provided user credentials are invalid'
        },
        interactive_action : {
```

```
            // for interactive clients, we should simply ask again
            state : 'continue',
            nextstep : 'post_user_creds'
            // a more sophisticated example would go to a step 'repost_user_creds' such an agent
            // would also need to react when there were too many failed attempts by using a more
            // sophisticated pattern to determine that situation
          }
      },
        { pattern : {
            status : 200,
            body : "xpath#..."
            // or whatever pattern is appropriate to determine that a security question is required
          },
          // this means the user credentials were correct, but the server wants an answer to a
          // security question
          action : {
            state : 'continue',
            nextstep : 'post_security_question',
            bodybindings : {
              variables : ['security_question'],
              security_question : 'jsonpath#...',
              // we fetch the security question from the response
            }
          }
      },
      { pattern : {
          status : 200,
          body : "regex#.*SAMLResponse.*"
          // we use a simple regular expression to determine that the 200 is actually
          // self-posting response
        },
        // this implies that the credentials were fine and there is no follow-up question
        action : {
          state : 'continue',
          nextStep : 'saml_sp_post',
          bodybindings : {
            variables : ['sp_post_action_url', 'sp_post_saml_request','sp_post_relay_state'],
            sp_post_action_url : 'xpath#...',
            sp_post_saml_request : 'xpath#...',
            sp_post_relay_state : 'xpath#...'
          }
        }
      }
    ]
  }
,
{ step : 'post_security_question',
  challengedata : [
      { id : 'post_security_question_q',
        kind : 'unspecified',
        interactive : {
          label : "@security_question@",
          type : 'string',
          required : true
        }
      }
  ],
  request : {
    method : 'POST',
    url : 'https://idp.example.org/SAML/security',
    headers : [
        { name : 'Content-Type', value : 'application/x-www-form-urlencoded' }
    ],
    body : 'answer=@post_security_question_q@'
  },
  responses : [
      { pattern : {
          status : 200,
          body : "regex#.*account_locked.*"
        },
        // it is determined that the user was also not able to answer multiple security
        // questions
        action : {
          state : 'error',
          errorcode : 'unspecified',
          errormessage : 'Your account has been locked'
        }
      },
      { pattern : {
```

```
         status : 200,
         body : "xpath#.*incorrect answer.*"
         // or whatever pattern is appropriate to determine that another security question
         // is required
      },
      // this means the security question was not answered correctly, but the server wants
      // an answer to another security question
      action : {
         state : 'continue',
         nextstep : 'post_security_question',
         bodybindings : {
            variables : ['security_question'],
            security_question : 'jsonpath#...',
            // fetch the new security question from the response
            }
         }
      },
      { pattern : {
         status : 200,
         body : "regex#.*SAMLResponse.*"
         // we use a simple regular expression to determine that the 200 is actually
         // self-posting response
      },
      // this implies that the security question was answered correctly and we can continue
      action : {
         state : 'continue',
         nextStep : 'saml_sp_post',
         bodybindings : {
            variables : ['sp_post_action_url', 'sp_post_saml_request','sp_post_relay_state'],
            sp_post_action_url : 'xpath#...',
            sp_post_saml_request : 'xpath#...',
            sp_post_relay_state : 'xpath#...'
            }
         }
      }
   ]
},
{ step : 'saml_sp_post',
   request : {
      method : 'POST',
      url : '@sp_post_action_url@',
      headers : [
         { name : 'Content-Type', value : 'application/x-www-form-urlencoded' }
      ],
      body : 'SAMLRequest=@sp_post_saml_request@&RelayState=@sp_post_relay_state@'
   },
   responses : [
      { action : { state : 'complete' }}
      // this last action always succeeds and clients should interpret the response back in
      // their own logic
   ]
}
]
```

Figure 3:
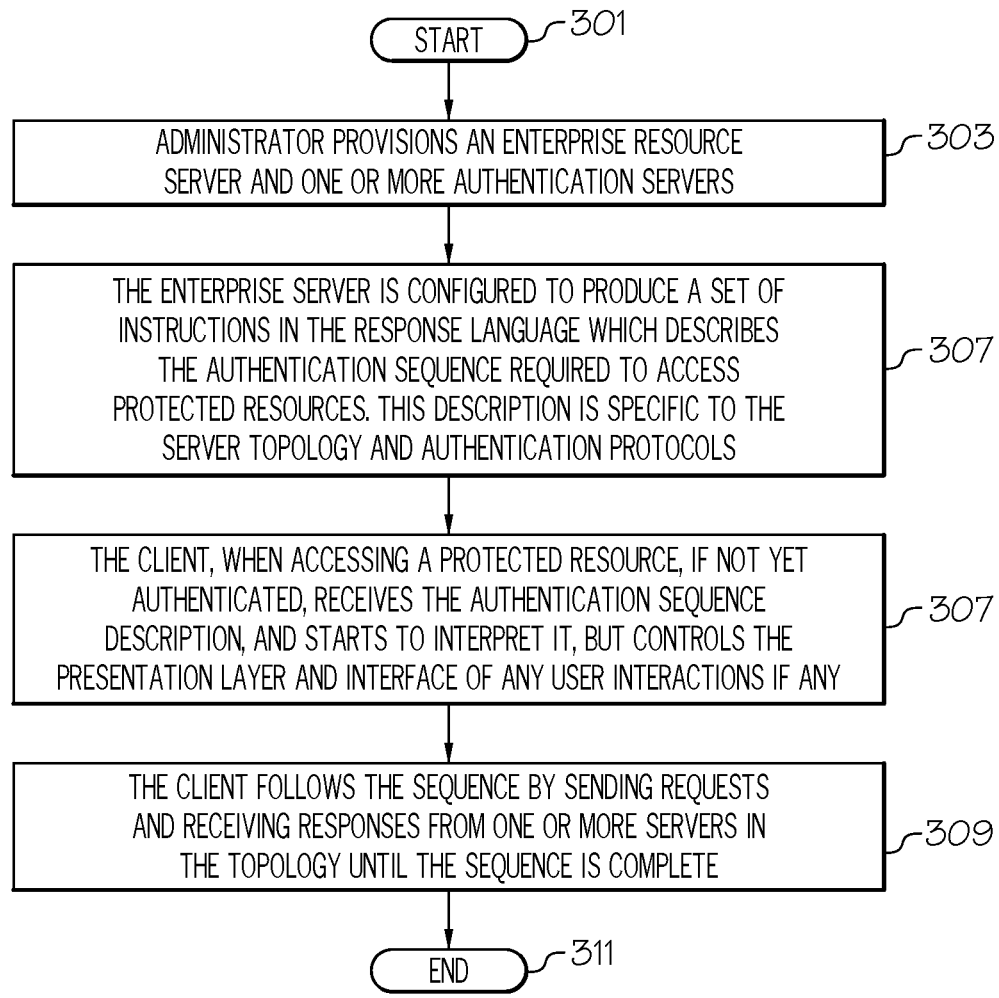
FIG. 3 is a high level flow chart of one or more steps performed by one or more processors and/or other hardware devices to abstract an authentication exchange in accordance with one or more embodiments of the present invention.

With reference now to FIG. 3, a high level flow chart of one or more steps performed by one or more processors and/or other hardware devices to abstract an authentication exchange in accordance with one or more embodiments of the present invention is presented.

After initiator block 301, an administrator provisions an enterprise resource server and one or more authentication server with an authentication response language, as described in block 303. The authentication response language allows the enterprise resource server to issue instructions for authentication steps to an enterprise client.

As described in block 305, the enterprise server is configured with a set of instructions in the Response Language which describes the authentication sequence required to access protected resources. This description is specific to the server topology and authentication protocols for navigating an authentication sequence.

As described in block 307, the enterprise client, when accessing a protected resource, and not already authenticated, receives a set of authentication instructions from the enterprise server formulated in the authentication response language. The client starts to interpret the provided authentication instructions, but controls the presentation layer and interface of any user interactions, if any.

As described in block 309, the client follows the sequence by sending requests and receiving responses from one or more servers in the topology until the sequence is complete.

The flow-chart ends at terminator block 311.

The authentication response language allows the server to issue instructions for authentication steps to a client (e.g., enterprise client 151 shown in FIG. 2). As described herein, the authentication response language enables the client to execute a set of instructions for navigating an authentication sequence (e.g., for the enterprise client 151). As also described herein, the set of instructions for navigating the authentication sequence vary depending on a protocol inherently used by the client. That is, enterprise client 151 may inherently (i.e., exclusively) use either HTTP or a non- HTTP (e.g., XML, JEE) protocol. Thus, the set of instructions for navigating the authentication sequence varies depending whether the protocol inherently used by the client is HTTP protocol or a non-HTTP protocol.

In one or more embodiments of the present invention, the authentication steps include the client sending credentials to the server. That is, the enterprise client 151 shown in FIG. 2 sends a password entered by a user, an IP address of the enterprise client 151, a MAC address or universal unique identifier (UUID) of the enterprise client 151, etc. to the server (computer 101) in order to establish its credentials.

In one or more embodiments of the present invention, the authentication steps include use of one or more response types of responses from the third party provider server. These response types are based on a pattern that includes a status of the enterprise's authentication, a header in the response, a body of the response, and a next action to be taken to authenticate the enterprise client.

That is, the enterprise server 201 and/or the enterprise client 151 may receive a response from the third party provider server 153 in response to the agent 212 requesting that the enterprise client 151 be authenticated. The response received by the third party provider server 153 may include a particular pattern related to a status of the enterprise client (i.e., whether or not it has been authenticated), a header in the response, a body of the response, and a next action to be taken to authenticate the enterprise client.

In one or more embodiments of the present invention, the enterprise server 201 provides/sends the enterprise client 151 a challenge element, which requires a user of the enterprise client to provide a predefined response to the challenge element (e.g., an answer to a security question, a password, etc.).

In one or more embodiments of the present invention, the authentication response language specification is defined in an interchange language, such as javascript object notation (JSON), extensible markup language (XML), thus providing additional freedom from having to initially communicate between the enterprise 206 and the third party provider 204 in HTTP (even though the subsequent authentication steps are HTTP requests and responses.

In one or more embodiments of the present invention, multiple servers are involved in the authentication steps. That is, as shown in FIG. 2, both the enterprise server 201 and the third party provider server 153 are involved in authenticating the enterprise client 151, thus taking much of the authentication workload away from the enterprise client 151.

Thus, as described herein, one or more embodiments of the present invention define a protocol-agnostic authentication language to enable a client to execute a set of instructions for navigating an authentication sequence, which varies depending on the used protocol or protocols. Moreover, the present invention allows for multiple servers to be involved in the authentication exchange.

As described herein, the present invention provides a method for authenticating a client, thus enabling a network-based session to occur between the client and other systems/resources, thereby improving the overall operation and function of the network and systems connected thereto.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
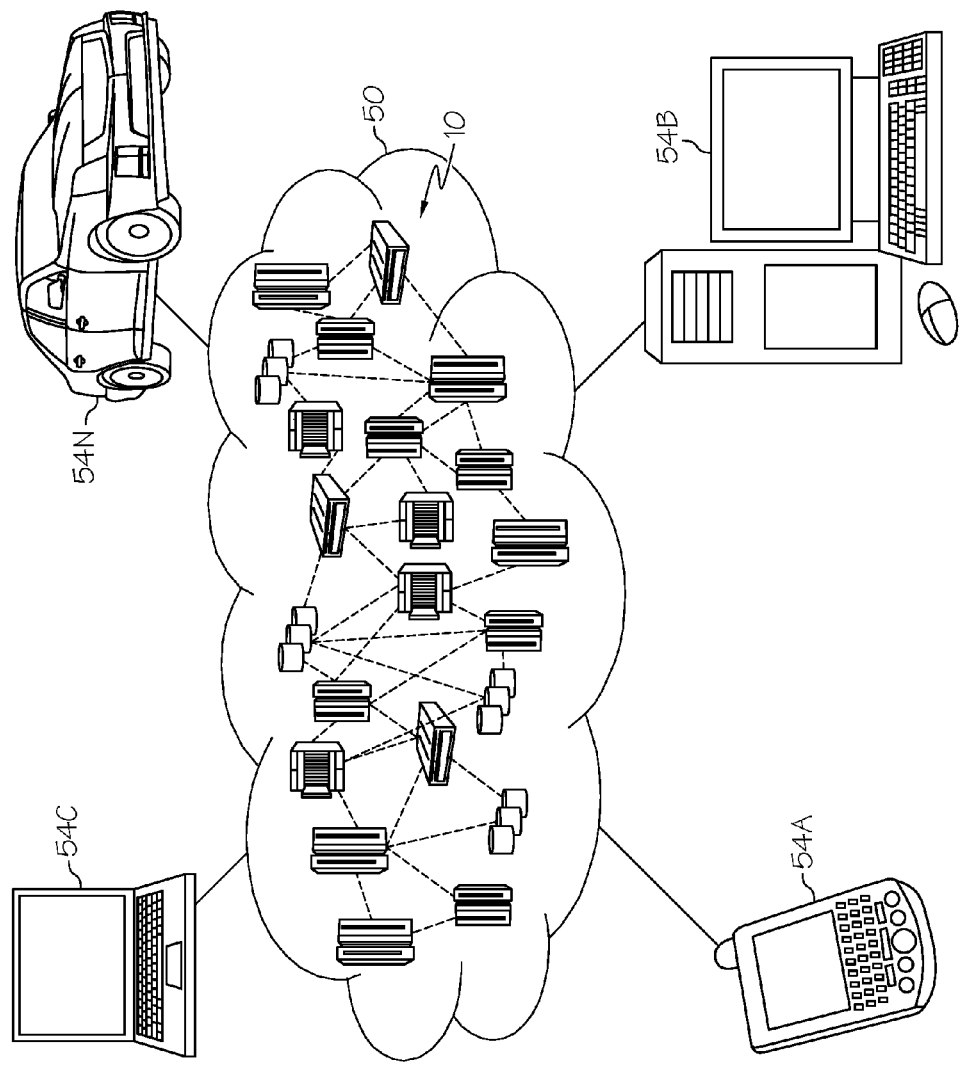
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 4 are intended to be illustrative only and that computing nodes 10 and cloud computing environment 50 can communicate with any type of computerized device over any type of network and/or network addressable connection (e.g., using a web browser).

Figure 5:
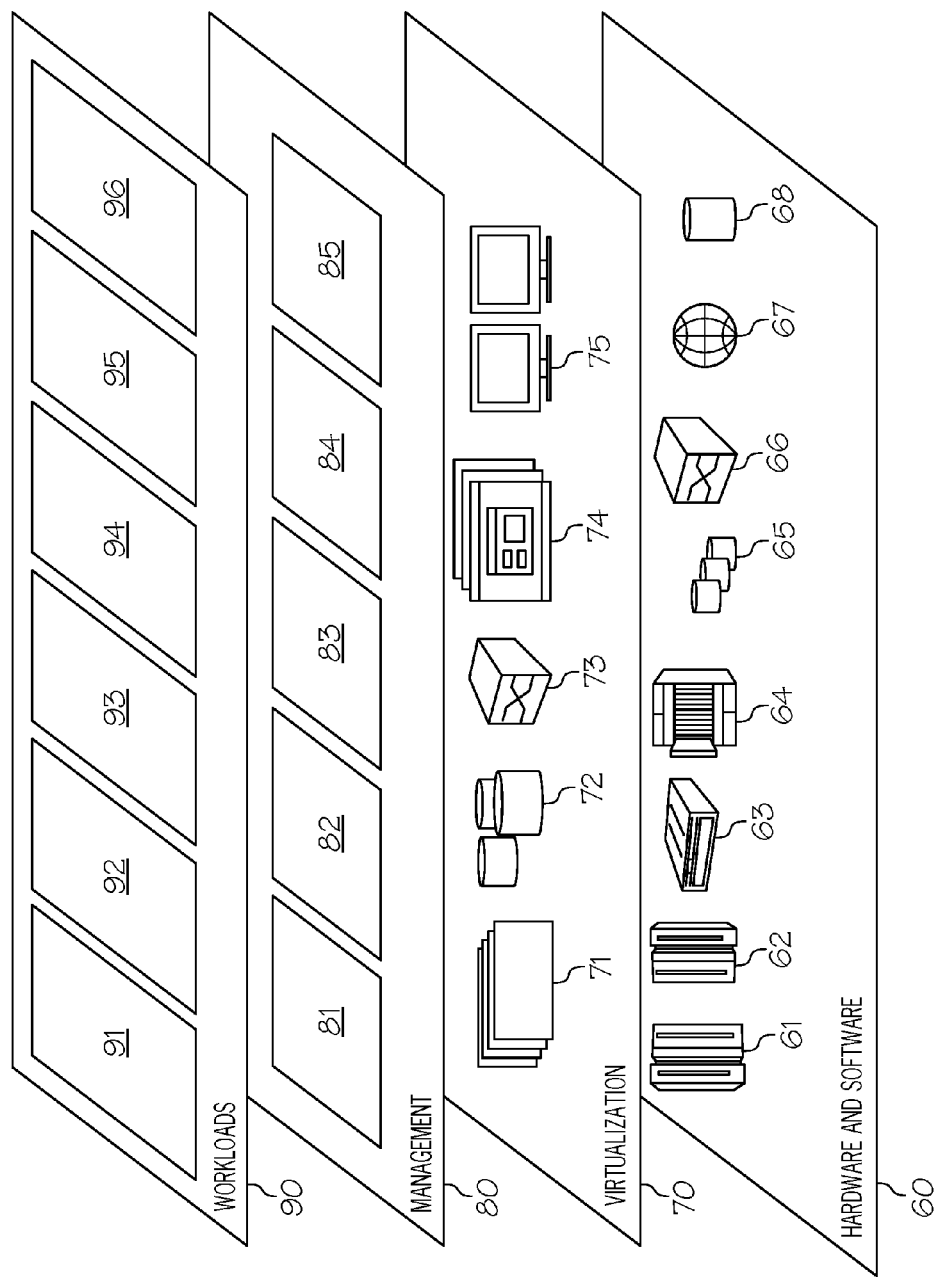
FIG. 5 depicts abstraction model layers of a cloud computer environment according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and device/client authentication processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method of abstracting an authentication sequence between a client, a server and zero or more authentication servers, the computer-implemented method comprising:
provisioning an enterprise server with an authentication response language, wherein the authentication response language allows the enterprise server to issue instructions for authentication steps to an enterprise client, wherein the authentication response language enables the enterprise client to execute a set of instructions for navigating an authentication sequence;
navigating, by one or more hardware processors, the authentication sequence depending on a protocol inherently used by the authentication topology;
receiving, by the enterprise client, a set of authentication instructions from the enterprise server formulated in the authentication response language, wherein the enterprise client is accessing a protected resource, and wherein the enterprise client is not already authenticated;
interpreting, by the enterprise client, the provided authentication instructions;
following, by the enterprise client, a sequence by sending requests and receiving responses from one or more servers in the authentication topology until the sequence is complete;
determining, by the one or more hardware processors, an authentication resolution of the enterprise client based on a success or fail caused by user interactions at the enterprise client; and
providing, by the one or more hardware processors, access to the protected resource in response to the authentication resolution of the enterprise client succeeding.

2. The computer-implemented method of claim 1, further comprising:
modifying, by the enterprise client, a presentation layer and interface of any user interactions according to an interpretation of the provided authentication instructions.

3. The method of claim 1, wherein the authentication resolution of the enterprise client is one of success or fail based on user interactions at the enterprise client.

4. The method of claim 1, wherein the protocol inherently used by the enterprise client is either HTTP or a non-HTTP native protocol.

5. The method of claim 1, wherein the authentication steps include the enterprise client sending credentials to an identity server other than the enterprise server.

6. The method of claim 1, wherein the authentication steps include use of one or more types of responses from any of multiple servers in the authentication topology, wherein the one or more response types are based on a pattern that includes a status of the enterprise's authentication, a header in the response, a body of the response, and a next action to be taken to authenticate the enterprise client.

7. The method of claim 6, further comprising:
providing, from the enterprise server to the enterprise client, a challenge element, wherein the challenge element requires a user of the enterprise client to provide a predefined response to the challenge element.

8. The method of claim 1, wherein the authentication response language specification is defined in any interchange language.

9. The method of claim 8, wherein the interchange language is javascript object notation (JSON).

10. The method of claim 8, wherein the interchange language is extensible markup language (XML).

11. The method of claim 1, wherein multiple third party servers are involved in the authentication steps.

12. A computer program product comprising one or more non-transitory computer readable storage mediums, and program instructions stored on at least one of the one or more non-transitory computer readable storage mediums, wherein the program instructions are executable by one or more hardware processors, and wherein the stored program instructions comprise:
program instructions to provision an enterprise server with an authentication response language, wherein the authentication response language allows the enterprise server to issue instructions for authentication steps to an enterprise client, wherein the authentication response language enables the enterprise client to execute a set of instructions for navigating an authentication sequence;
program instructions to navigate the authentication sequence depending on a protocol inherently used by the authentication topology;
program instructions to receive a set of authentication instructions from the enterprise server formulated in the authentication response language, wherein the enterprise client is accessing a protected resource, and wherein the enterprise client is not already authenticated;
program instructions to interpret, by the enterprise client, the provided authentication instructions;
program instructions to follow, by the enterprise client, a sequence by sending requests and receiving responses from one or more servers in the authentication topology until the sequence is complete;
program instructions to determine an authentication resolution of the enterprise client based on a success or fail caused by user interactions at the enterprise client; and
program instructions to provide access to the protected resource in response to the authentication resolution of the enterprise client succeeding.

13. The computer program product of claim 12, further comprising:
program instructions to modify, by the enterprise client, a presentation layer and interface of any user interactions according to an interpretation of the provided authentication instructions.

14. The computer program product of claim 12, wherein the authentication resolution of the enterprise client is one of success or fail based on user interactions at the enterprise client.

15. The computer program product of claim 12, wherein the program instructions are provided as a service in a cloud environment.

16. A computer system comprising one or more processors, one or more non-transitory computer readable memories, and one or more non-transitory computer readable storage mediums, and program instructions stored on at least one of the one or more non-transitory computer readable storage mediums for execution by at least one of the one or more hardware processors via at least one of the one or more non-transitory computer readable memories, the stored program instructions comprising:

program instructions to provision an enterprise server with an authentication response language, wherein the authentication response language allows the enterprise server to issue instructions for authentication steps to an enterprise client, wherein the authentication response language enables the enterprise client to execute a set of instructions for navigating an authentication sequence;

program instructions to navigate the authentication sequence depending on a protocol inherently used by the authentication topology;

program instructions to receive a set of authentication instructions from the enterprise server formulated in the authentication response language, wherein the enterprise client is accessing a protected resource, and wherein the enterprise client is not already authenticated;

program instructions to interpret, by the enterprise client, the provided authentication instructions;

program instructions to follow, by the enterprise client, a sequence by sending requests and receiving responses from one or more servers in the authentication topology until the sequence is complete;

program instructions to determine an authentication resolution of the enterprise client based on a success or fail caused by user interactions at the enterprise client; and program instructions to provide access to the protected resource in response to the authentication resolution of the enterprise client succeeding.

17. The computer system of claim 16, wherein the authentication steps include use of one or more response types of responses from a third party provider server, wherein the one or more response types are based on a pattern that includes a status of the enterprise's authentication, a header in the response, a body of the response, and a next action to be taken to authenticate the enterprise client.

18. The computer system of claim 17, further comprising:
    program instructions to provide, from the enterprise server to the enterprise client, a challenge element, wherein the challenge element requires a user of the enterprise client to provide a predefined response to the challenge element.

19. The computer system of claim 16, wherein the authentication response language specification is defined in javascript object notation (JSON).

20. The computer system of claim 16, wherein the authentication response language specification is defined in extensible markup language (XML).

* * * * *